(No Model.)
C. F. KULP.
GRAIN DRILL.
No. 299,405. Patented May 27, 1884.
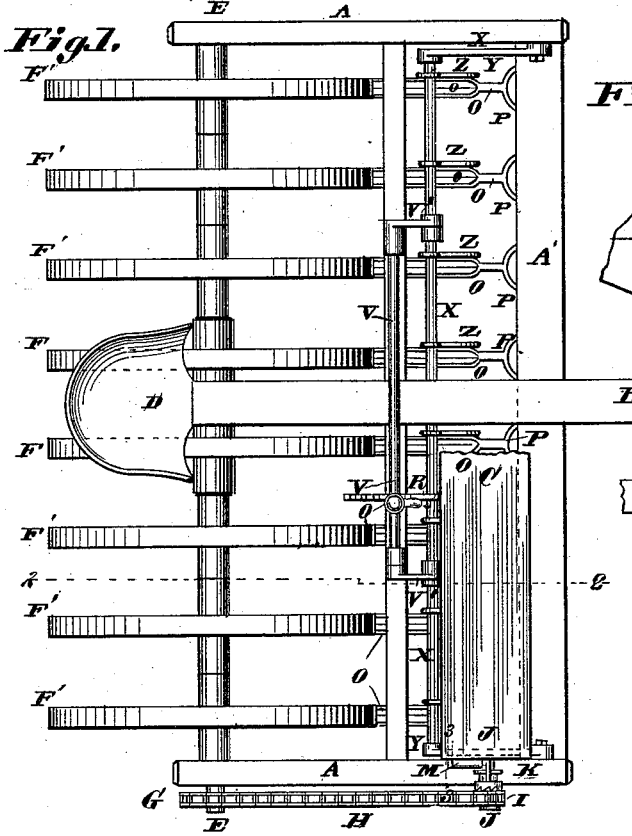
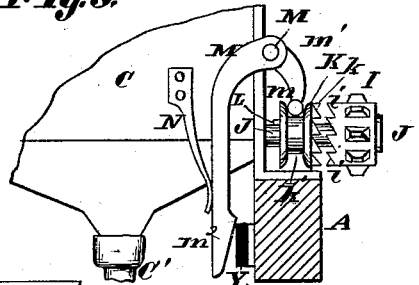
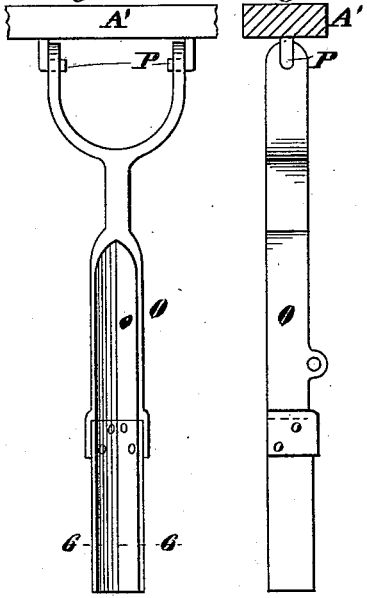
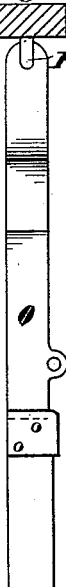
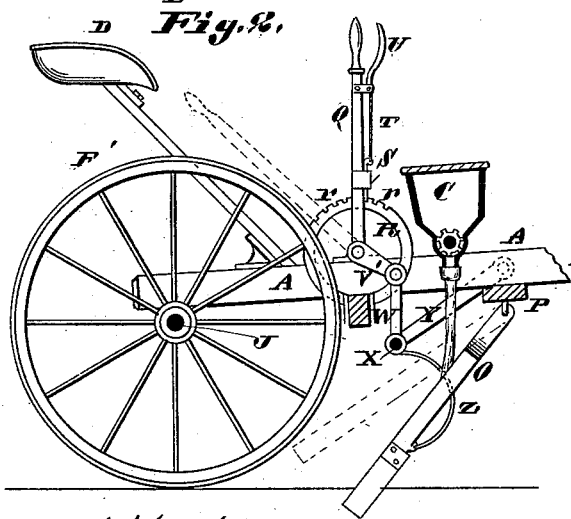
Inventor:
Chas. F. Kulp
By Knight Bros
Attys
Attest:
Edward Stein,
Geo. W. Shulock

UNITED STATES PATENT OFFICE.

CHARLES F. KULP, OF BRUSSELS, ILLINOIS.

GRAIN-DRILL.

SPECIFICATION forming part of Letters Patent No. 299,405, dated May 27, 1884.

Application filed December 19, 1883. (No model.)

*To all whom it may concern:*

Be it known that I, CHARLES F. KULP, of Brussels, in the county of Calhoun and State of Illinois, have invented certain new and useful Improvements in Grain-Drills, of which the following is a full, clear, and exact description, reference being had to the accompanying drawings, forming part of this specification.

Reference is made to the claims for statement of invention.

Figure 1 is a top view of the machine with parts broken away. Fig. 2 is a transverse section at 2 2, Fig. 1. Fig. 3 is an enlarged detail vertical section at 3 3, Fig. 1. Fig. 4 is a rear view of one of the furrow-openers, and Fig. 5 is a side view of same. Fig. 6 is a cross-section of furrow-opener at 6 6, Fig. 4.

A is the main frame; B, the tongue; C, the seed-box, and D the driver's seat, the latter being set well back to counterbalance to some degree the weight of the parts before the axle. The axle E turns in boxes secured to the longitudinal bars of the frame.

F F are two drive-wheels, that are fixed to the axle at about its middle, and which cause the revolution of the axle when the machine is being moved forward.

F' are a number (two or more) of wheels, which turn freely on the axle. Each of the wheels F and F' follows one of the furrow-openers, so as to compact the soil about the seeds that have been deposited in the furrows. The arrangement of the wheels F F' upon the axle is such that when the machine is being simply turned around upon the wheels F as a center the axle is not rotated and the loose wheels F' turn half of them in one direction and the other half in the other, thus allowing the machine to be turned with the greatest ease.

Upon the axle is a sprocket-wheel, G, connected by the gear-chain H with a sprocket-wheel, I, turning loosely upon the feed-shaft J of the seed-box or hopper C, except when clutched thereto.

K is a clutch-wheel turning with the shaft J by means of a spline, L. The sides of the wheels I and K have matching teeth $i$ and $k$, respectively, forming the clutch by which the rotation of the sprocket-wheel I is communicated to the wheel K and shaft J.

M is a bell-crank lever whose toe $m$ rests in a circumferential groove, $k'$, of the wheel K, so that by the movement of the lever M on its fulcrum $m'$ the clutch may be thrown in and out of engagement.

N is a spring, tending to keep the clutch in engagement.

The furrow-openers O are connected to the cross-bar A' of the frame A by hinges P, so that the openers can be inclined more or less to regulate the depth to which their shares enter the ground.

Q is a hand-lever working over a guide-bar, R, having a number of notches, $r$, in its upper edge for the engagement of a drop-latch, S, sliding in a guide upon the lever. The latch is lifted from the notch by a small lever, U, connected to the latch by a rod, T. The lever Q forms the arm of a rock-shaft, V, having arms V' connected by links W to a rod or bar, X, supported upon swing-arms Y. The bar X is connected to each of the furrow-openers by a spring-link, Z, the flexibility of the link allowing the furrow-opener to rise and pass over any immovable obstruction. It will be seen by examination of Fig. 2 that the forward movement of the lever Q will depress the ends of the furrow-openers, and vice versa. When the lever Q is carried back into the position shown in Fig. 2 in dotted lines, the furrow-openers are lifted from the ground. In this case the rotation of the feed-shaft J should be stopped; and to accomplish this the bell-crank lever M is furnished with an inclined toe, $m^2$, with which one of the arms Y comes in contact as the openers leave the ground. (See Fig. 3.) It will be seen that the arm Y throws the toe $m^2$ from the frame-bar A and disengages the clutch.

I propose to cover the parts of the wheels F F' in proximity to the seat with a guard of sheet metal or other material, to protect the clothing of the driver.

The furrow-openers have open channels $o$ on the rear upper sides, to carry the grain from the flexible tubes C' to the furrows.

I claim herein as new and of my invention—

1. A grain-drill having central wheels, F, fast to the axle, and wheels F' on each side of the central wheels loose upon the axle, substantially as set forth.

2. A grain-drill having one or more ground-wheels, F, fast upon the middle of the axle and wheels upon each side of the same, turning loose on the axle.

3. The combination of axle E, one or more drive-wheels, F, turning on the ground and fast to the middle of the axle, sprocket-wheels G I, chain H, shaft J, and clutch-wheel K, substantially as and for the purpose set forth.

4. The combination, in a grain-drill, of lifting-arm Y, connected to the furrow-openers, bell-crank M, with toes $m\ m^2$, slip-clutch wheel K, and drive-wheel I, turning loosely on seed-shaft J, substantially as and for the purpose set forth.

5. The combination, in a grain-drill, of furrow-openers O, flexible links Z, lifting-bar X, link or links W, arm or arms V', shaft V, and lever Q, substantially as set forth.

CHARLES F. KULP.

Witnesses:
CHARLEY CAMPBELL,
HENRY G. STILES.